Jan. 25, 1949.        J. D. COLE        2,460,063
ELECTRIC MOTOR
Filed March 15, 1946
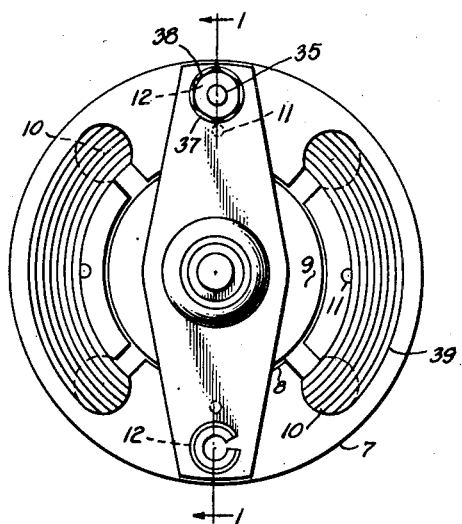
Fig. 2.
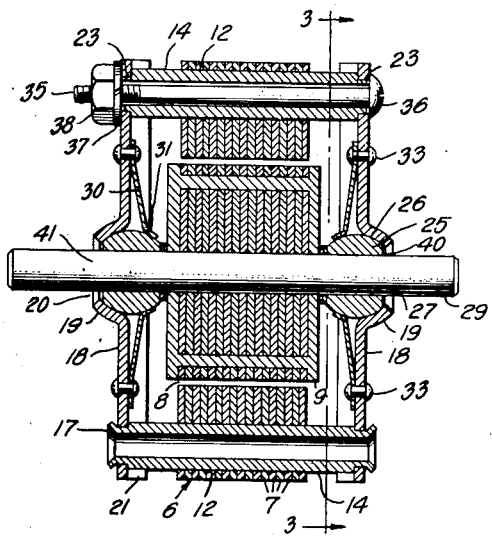
Fig. 1.
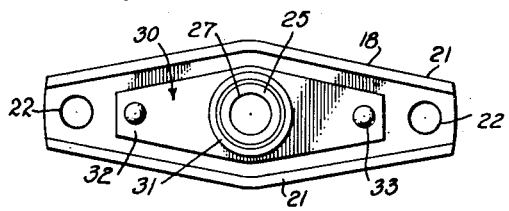
Fig. 3.
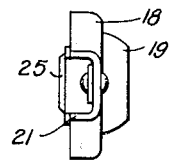
Fig. 4.
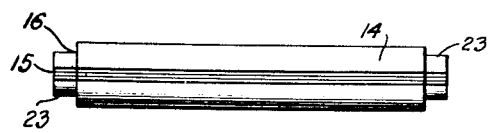
Fig. 5.
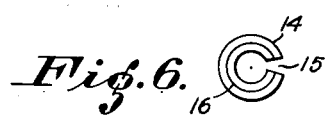
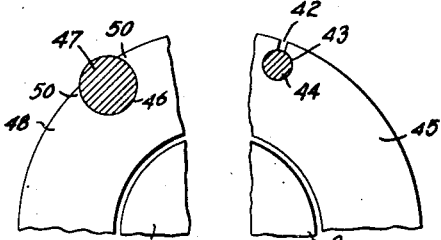
Fig. 8.    Fig. 7.
INVENTOR.
JAMES D. COLE
BY Hans W. Hefter
ATTORNEY.

Patented Jan. 25, 1949

2,460,063

UNITED STATES PATENT OFFICE 2,460,063

ELECTRIC MOTOR

James D. Cole, Park Ridge, Ill.

Application March 15, 1946, Serial No. 654,573

7 Claims. (Cl. 172—36)

The invention relates to improvements in electric motors and particularly is directed to novel means of aligning the armature bearings with the armature bore in the stator and to the means for attaching the bearing brackets, which contain the bearings for the armature shaft, on the stator lamination stack.

It is an object of the invention to mount the bearing brackets for the armature shaft to the stator lamination stack in such a manner that the armature, when supported by its shaft in the bearings, will be positioned in axial alinement with the axis of the stator bore and absolutely concentric within the stator bore provided in the stator lamination stack, so that an air gap of extremely small size may be safely employed between the rotating armature and the stator bore.

Another object of the invention is to provide a frame-less electric motor in which the bearing brackets for the armature shaft are supported by alignment and mounting members which extend through the stator lamination core and which project from the end faces thereof and have their ends properly machined to form thereon a seat for the bearing brackets, which are arranged in axially spaced relation from the end faces of the stator lamination stack.

It is also an object of the invention to provide the stator lamination stack of an electric motor with longitudinal alignment members held in position in the lamination stack by means of exerting on or resisting radial pressure of a relatively uniform value on each one of a plurality of laminations. Said radial pressure provides sufficient friction to hold the alignment members securely in position in their respective holes provided in the lamination stack.

Still another object of the invention is to provide the stator lamination stack of an electric motor with longitudinally slit tubular bushings which extend through suitable bores arranged parallel to the axis of the stator bore in the stator lamination stack. These slit bushings owing to their circumferential resiliency engage the walls of said bores with sufficient friction to remain permanently in the desired position to which they are adjusted in the assembly of the motor. Both ends of the tubular bushings which project from the end faces of the stator stack are each provided with an annular shoulder forming a seat for the bearing brackets to be mounted thereon.

A still further object of the invention is to simplify the manufacture and assembly of fractional horsepower motors by providing the stator lamination stack with dependable means to support thereon the bearing brackets which are employed to hold the bearings for the armature shaft, said means being constructed and arranged in such a manner to assure a perfect concentric arrangement of the armature within the stator bore when the bearing brackets are attached thereto without requiring any adjustment whatsoever. All of the parts are adapted to be readily produced economically and with such accuracy that the same may be assembled speedily without difficulties by unskilled labor.

These and other objects of the invention which will later appear, are accomplished by the simple and practical construction and arrangement of parts hereinafter described and illustrated in the accompanying drawing, in which:

Fig. 1 is a longitudinal sectional view of the motor substantially along the line 1—1 of Fig. 2.

Fig. 2 is an end elevation view of the motor.

Fig. 3 is an elevation view of one of the bearing bracket assemblies, substantially along the line 3—3 of Fig. 2 looking in the direction of the arrows.

Fig. 4 is an end elevation view of the bearing bracket assembly.

Fig. 5 is a somewhat enlarged elevation view of one of the slit tubular bushings, and Fig. 6 is an end view of the same.

Fig. 7 illustrates a modified alignment member and its mounting in the laminations, and Fig. 8 illustrates another mode of mounting the alignment member of Fig. 7 in the laminations.

Referring to the drawing, Fig. 1 discloses by way of example an electric motor provided with a stator lamination stack 6, composed of a suitable number of stator laminations 7 of circular outline and provided with a concentric aperture 8 forming the stator bore for the armature 9 of the motor. The laminations 7 are provided with a number of slots 10 for accommodating the stator or field winding 39. It will be obvious as the description proceeds, that it is immaterial as far as the scope of the present invention is concerned, whether the stator laminations are circular, rectangular, oval or of any other shape, or whether the armature is arranged concentric or eccentric with respect to the outline of the stator lamination.

The stator lamination stack 6 is held together by a plurality of rivets 11 passing through suitable holes in the laminations 7. The stator laminations 7 are provided also with two other holes 12 arranged in the present instance equidistant from the center of the aperture 8 and diametrically opposed to each other adjacent the outer circumference of the lamination. These holes 12 are provided for the reception of longitudinal members, such as tubular bushings 14 which are longitudinally slit as shown at 15 in Figs. 4 and 5. These bushings 14 fit snugly in the holes 12 and owing to their circumferential resiliency, which is due to the slit 15, they are easily inserted in the lamination stack 6 and remain permanently in the position to which they are adjusted by exerting a continuous radial pressure against the wall of the holes in the laminations. Both ends of the bushings 14 extend a predetermined distance from the end faces of the lamination stack 6 and are provided with a reduced cross-section forming annular shoulders 16 which serve as a seat for the bearing brackets 18 described hereinafter in more detail.

Preferably, the shoulders 16 are machined onto the ends of the longitudinal members, which may consist of the bushings 14 or of the solid rods 44 shown in Figs. 7 and 8, after these longitudinal members have been inserted in the stator lamination stack 6. The machining is done preferably by a two spindle spot-facing machine tool having the axes of the tool spindles properly indexed from the center axis of the stator bore 8, so that regardless of any distortions of the bushings 14 they are nevertheless provided with annular shoulders 16 the center points of which have a predetermined and definite relation to the position of the axis of the stator bore.

If desired, however, the annular shoulders 16 and the annular projections 23 formed by the same may be machined individually on the ends of the longitudinal members 14 or 44 before the same are inserted in the stator lamination stack 6. In the latter case the cost of manufacture may be somewhat reduced, but the accuracy of the alignment of the bearing brackets 18 is apt to suffer to a certain extent, which however, may not be harmful, depending, of course, upon the particular requirements which the motor is expected to meet.

The bearing brackets 18 preferably are stamped from a strip of sheet metal having its widest center portion provided with an extruded spherical bearing flange 19 forming an aperture at 20. The sheet metal strip is provided with two longitudinal flanges 21 extending from one end of the bracket 18 toward the other. Both ends of the bracket 18 are provided with a bore 22 for receiving the annular projections 23 formed by the annular shoulders 16 on the split bushings 14, (Figs. 4, 5) or on the rods 44 (Figs. 7 and 8), the flat inner face of the bracket 18 coming to rest on said annular shoulders 16.

A self-alining bearing member 25 having spherical outer surface 26 and a diametric bore 27 for the bearing journal on the armature shaft 29 is adapted to engage loosely the inner spherical seat formed by the bearing flange 19 of the bearing bracket 18 and is urged in engagement with said seat by a leaf spring 30 provided with an extruded companion spherical flange 31 and two outwardly extending arms 32 having their outer ends secured to the bearing bracket 18 by means of rivets 33 or the like. This bearing member 25 is preferably made of a material that is self-lubricating, so that no other means of lubricating the journals of the armature shaft is required.

Fig. 1 illustrates two alternate means of securing the bearing brackets 18 in position after they are attached to the annular projections 23 at the ends of the slit bushings 14. One securing means comprises a tie bolt 35 which is loosely inserted into the bushing 14 and engages with its head 36 at one end one of the bearing brackets 18, while the other end of the tie bolt 35 is provided with a lock washer 37 and a nut 38, whereby upon tightening of the nuts 38 the bearing brackets 18 are clamped against the respective annular shoulders 16 on the bushings 14.

Alternately, and as illustrated in the lower portion of Fig. 1, the annular projections 23 on the bushings 14 may be made somewhat longer than the wall thickness of the bearing brackets 18 and the excess length of these annular projections 23 may be spun over the outer face of the bearing brackets 18 as shown at 17 to hold the brackets 18 permanently in position against the seats 16 on the bushings 14. In the last mentioned case no tie bolts are required. Tie bolts, however, are usually of advantage in cases where the motor is to be enclosed in an outer casing, for example, if the motor is used as a prime mover for a fan or the like. The tie bolts in such a case may be made a little longer and used as a means for securing the casing or even a motor stand or supporting base thereto.

Prior to attaching the bearing bracket assemblies 18, 25, 30 to the split bushings 14, the armature assembly comprising the shaft 29 and the armature 9 fixed thereto is inserted in the stator bore of the stator lamination stack 6 and the shaft journals 40 and 41 are inserted in their respective bearing members 25. The stator lamination stack, of course, has to be provided with the stator or field winding 39, before the armature assembly is inserted into the same. The bearing brackets 18 are then slipped upon the annular projections 23 at the ends of the bushings 14, whereby the armature 9 is automatically positioned concentrically within the stator bore without any adjustment whatsoever. The insertion and tightening of the tie bolts 35 or the spinning operation on the annular projection 23 does not disturb nor change the concentric position of the armature 9 within the stator bore.

While the Figs. 1 and 2 disclosed tubular members which are slit longitudinally so as to exert a radial resilient pressure against the walls of the holes in the lamination 7, the invention is not limited to this particular type of securing the longitudinal alignment members to the stator lamination stack. The Figs. 7 and 8 illustrate each a modification of the means for securing the longitudinal members in position. In Fig. 7 the alignment member consists of a solid rod 44 of circular cross-section inserted in a hole 43 of the laminations 45 which hole is connected by a slot 42 with the outer circumference of the laminations. The arrangement is such that the body of the rod resists the radial pressure exerted by the lamination portions adjacent the slot 42 of the laminations, thereby holding the rod 44 securely in its adjusted position. In Fig. 8 the circular hole 46 for the solid alignment rod 47 intersects the outer circumference of the stator laminations 48. Therefore, the rod 47 is arranged partly outside the circumference of the laminations 48, which latter have portions indicated with 50 adjacent the hole 46 which exert a resilient radial pressure upon the rod 47 and hold it in position. The ends of the rod 44 are machined to form the annular shoulders 16 known from the tubular bushings 14. The reduced ends of the rod 44 are preferably axially bored to provide tubular end projections, similar to the one designated with 23, for convenient spinning over the outer end face of the bearing brackets 18.

The foregoing disclosure is to be regarded as descriptive and illustrative only, and not as restrictive or limitative of the invention, of which obviously other embodiments may be constructed including the many modifications without departing from the general scope herein indicated and set forth in the appended claims.

What I claim new and desire to secure by Letters Patent is:

1. In an electric motor, the combination with a stator lamination stack having a bore for the reception of an armature, of tubular members mounted in holes extending through said stator lamination stack parallel to the axis of said bore, said tubular members being diametrically resilient and engaging the wall of the holes with a snug fit and projecting with their ends from the end faces of said stator lamination stack and being provided at their outer extremities with a reduced diameter forming annular shoulders, bearing brackets provided with a bearing for the armature shaft and having apertures into which extend the outer reduced diameter portions of said tubular members, and means for clamping said bearing brackets against said annular shoulders on said tubular bushings, said means comprising tie bolts extending loosely through said tubular bushings and at least one nut on said tie bolts for urging the brackets against said annular shoulders, whereby the bearing brackets are supported by said tubular bushings in a position in which the bearings are in axial alinement with the axis of the bore for the armature in said stator lamination stack.

2. In an electric motor, the combination with a stator lamination stack having a bore for the reception of an armature, of at least two longitudinally slit tubular bushings mounted in holes extending through said stator lamination stack, said holes extending parallel to the axis of said bore and are arranged at diametrically opposed points of the latter, said tubular bushings owing to their inherent diametric resiliency engaging the wall of the holes with a snug fit and projecting with their ends from the end faces of said stator lamination stack and being provided at their outer extremities with a reduced diameter forming annular shoulders which are arranged a predetermined distance away from the end faces of said stack, bearing brackets provided with a bearing for the armature shaft and having apertures into which extend the outer reduced diameter portions of said tubular bushings, tie bolts extending loosely through said tubular bushings, and means at the ends of said tie bolts and engaging said brackets for clamping the same against said annular shoulders on said tubular bushings, whereby the bearing brackets are supported by said tubular bushings in a position in which the bearings are in axial alinement with the axis of the bore for the armature in said stator lamination stack.

3. In an electric motor, the combination with a stator lamination stack having a bore for the reception of an armature, of tubular members mounted in holes extending through said stator lamination stack parallel to the axis of said bore, said tubular members being diametrically resilient and engaging the wall of the holes with a snug fit and projecting with their ends a predetermined distance from the end faces of said stator lamination stack and being provided at their outer extremities with a reduced diameter portion forming annular shoulders, and bearing brackets provided with a bearing for the armature shaft and having bores into which extend the outer reduced diameter portions of said tubular bushings, said bearing brackets resting with their inner faces against the annular shoulders formed on said tubular bushings in axial spaced relation from the end faces of said stator lamination stack and in a position in which the bearings are in axial alinement with the axis of the bore for the armature in said stator lamination stack, the outer ends of the reduced diameter portions being deformed outwardly over the outer face of said bearing brackets to lock the latter in position on said tubular members.

4. In an electric motor, the combination with a stator lamination stack having a bore for the reception of an armature, of tubular bushings mounted in holes extending through said stator lamination stack parallel to the axis of said bore, said tubular bushings owing to their inherent diametric resiliency engaging the wall of the holes with a snug fit and projecting with their ends from the end faces of said stator lamination stack and being provided at their outer extremities with a reduced diameter forming annular shoulders, said annular shoulders being positioned in a plane spaced a predetermined distance from said end faces, bearing brackets provided with a bearing for the armature shaft and having bores into which extend the outer reduced diameter portions of said tubular bushings, and means for clamping said bearing brackets against said annular shoulders on said tubular bushings, whereby the bearing brackets are supported by said tubular bushings in a position in which the bearings are in axial alinement with the axis of the bore for the armature in said stator lamination stack.

5. In an electric motor, the combination with a stator lamination stack having a bore for the reception of an armature, of longitudinally slit tubular bushings mounted in holes extending through said stator lamination stack parallel to the axis of said bore, said tubular bushings owing to their inherent diametric resiliency engaging the wall of the holes with a snug fit and projecting with their ends from the end faces of said stator lamination stack and being provided at their outer extremities with a reduced diameter forming annular shoulders, bearing brackets provided with a bearing for the armature shaft and having bores into which extend the outer reduced diameter portions of said tubular bushings, and means for clamping said bearing brackets against said annular shoulders, whereby the bearing brackets are supported by said tubular bushings in a position in which the bearings are in axial alinement with the axis of the bore for the armature in said stator lamination stack.

6. In an electric motor, the combination with a stator lamination stack having a bore for the reception of an armature, of longitudinally slit tubular bushings mounted in holes extending through said stator lamination stack parallel to the axis of said bore, said tubular bushings owning to their inherent diametric resiliency engaging the wall of the holes with a snug fit and projecting with their ends from the end faces of said stator lamination stack and being provided at their outer extremities with a reduced diameter forming annular shoulders, bearing brackets provided with a bearing for the armature shaft and having bores into which extend the outer reduced diameter portions of said tubular bushings, tie bolts extending loosely through said tubular bushings, and means at the ends of said tie bolts and engaging said brackets for clamping the same against said annular shoulders on said tubular bushings, whereby the bearing brackets are supported by said tubular bushings in a position in which the bearings are in axial alinement with the axis of the bore for the armature in said stator lamination stack.

7. In an electric motor, the combination with a stator lamination stack having a bore for the reception of an armature, of longitudinally slit tubular bushings mounted in holes extending through said stator lamination stack parallel to the axis of said bore, said tubular bushings owning to their inherent diametric resiliency engaging the wall of the holes with a snug fit and projecting with their ends from the end faces of said stator lamination stack and being provided at their outer extremities with a reduced diameter forming annular shoulders positioned in a plane spaced a predetermined distance from said end faces, and bearing brackets provided with a bearing for the armature shaft and having bores into which extend the outer reduced diameter portions of said tubular bushings and means clamping said bearing brackets against said annular shoulders on said bushings, whereby the bearing brackets are supported by said tubular bushings in axial spaced relation from the end faces of said stator lamination stack and in a position in which the bearings are in axial alinement with the axis of the bore for the armature in said stator lamination stack.

JAMES D. COLE.

REFERENCES CITED

The following references are of record in the file of this patent:

UNITED STATES PATENTS

| Number | Name | Date |
|---|---|---|
| 1,323,045 | Gilbert | Nov. 25, 1919 |
| 1,611,942 | Persons | Dec. 28, 1926 |
| 1,651,061 | Janette | Nov. 29, 1927 |
| 2,025,817 | Lanz | Dec. 31, 1935 |